(12) United States Patent
Kanakatte Gurumurthy et al.

(10) Patent No.: US 12,456,202 B2
(45) Date of Patent: Oct. 28, 2025

(54) METHODS AND SYSTEMS FOR AUTOMATED IMAGE SEGMENTATION OF ANATOMICAL STRUCTURE

(71) Applicant: Tata Consultancy Services Limited, Mumbai (IN)

(72) Inventors: Aparna Kanakatte Gurumurthy, Bangalore (IN); Avik Ghose, Kolkata (IN); Divya Manoharlal Bhatia, Bangalore (IN); Jayavardhana Rama Gubbi Lakshminarasimha, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 392 days.

(21) Appl. No.: 18/213,931

(22) Filed: Jun. 26, 2023

(65) Prior Publication Data
US 2024/0005512 A1    Jan. 4, 2024

(30) Foreign Application Priority Data
Jun. 30, 2022 (IN) .............................. 202221037838

(51) Int. Cl.
*G06T 7/12* (2017.01)
*G06T 15/00* (2011.01)
(Continued)

(52) U.S. Cl.
CPC ............... *G06T 7/12* (2017.01); *G06T 15/00* (2013.01); *G06V 10/25* (2022.01); *G06V 10/44* (2022.01); *G06V 10/764* (2022.01); *G06V 10/771* (2022.01)

(58) Field of Classification Search
None
See application file for complete search history.

(56) References Cited

U.S. PATENT DOCUMENTS

2019/0261945 A1* 8/2019 Funka-Lea ............ G06T 15/205
2021/0012885 A1* 1/2021 Arafati .................... G06T 7/174
(Continued)

OTHER PUBLICATIONS

Gatti, A.A., Maly, M.R. Automatic knee cartilage and bone segmentation using multi-stage convolutional neural networks: data from the osteoarthritis initiative. Magn Reson Mater Phy 34, 859-875 (Jun. 2021). https://doi.org/10.1007/s10334-021-00934-z (Year: 2021).*

(Continued)

*Primary Examiner* — Tahmina N Ansari
(74) *Attorney, Agent, or Firm* — Finnegan, Henderson, Farabow, Garrett & Dunner, LLP

(57) ABSTRACT

This disclosure relates generally to methods and systems for automated image segmentation of an anatomical structure such as heart. Most of the techniques in literature are using 2-D or slice by-slice data due to lightweight and need of less data for training. These networks lack 3-D contextual information. Further, the conventional techniques are inaccurate and inefficient in the 3-D image segmentation till the last slice of the image. The present disclosure solves automated 3-D image segmentation of the anatomical structure such as heart, by proposing a new Generative Adversarial Network (GAN) based architecture for the 3-D segmentation, with a patch-based extraction technique and a class-weighted generalized dice loss. The proposed 3-D GAN based architecture is capable of storing the 3-D contextual information for the image segmentation of the anatomical structure, with high accuracy.

17 Claims, 9 Drawing Sheets

(51) Int. Cl.
    *G06V 10/25*     (2022.01)
    *G06V 10/44*     (2022.01)
    *G06V 10/764*    (2022.01)
    *G06V 10/771*    (2022.01)

(56) References Cited

U.S. PATENT DOCUMENTS

| | | | |
|---|---|---|---|
| 2021/0248747 A1* | 8/2021 | Tang | G06N 3/045 |
| 2022/0012890 A1* | 1/2022 | Wu | G06T 7/0012 |
| 2022/0036128 A1* | 2/2022 | Levanony | G06F 18/24 |
| 2024/0005512 A1* | 1/2024 | Kanakatte Gurumurthy | G06T 7/12 |
| 2025/0104221 A1* | 3/2025 | Shanbhag | G16H 30/40 |

OTHER PUBLICATIONS

Morris, Eric D., et al. "Cardiac substructure segmentation with deep learning for improved cardiac sparing." Medical physics 47.2 (2020): 576-586. (Year: 2020).*

Cirillo et al., "Vox2Vox: 3D-GAN for Brain Tumour Segmentation," Brainlesion: Glioma, Multiple Sclerosis, Stroke and Traumatic Brain Injuries, (2020).

Le et al., "Auto Whole Heart Segmentation from CT images Using an Improved Unet-GAN," (2021).

Morris et al., "Cardiac substructure segmentation with deep learning for improved cardiac sparing," Med Phys, 47(2):576-586 (2020).

\* cited by examiner

```
                                                           ┌─ 200
                                                           │
                                                           ↓
```

| |
|---|
| Receive a plurality of 3-dimensional (3-D) training images corresponding to the anatomical structure and a ground-truth 3-D image associated with each of the plurality of 3-D training images, wherein the plurality of 3-D training images is associated with a plurality of classes of the anatomical structure 202 |

▼

| |
|---|
| Pre-process the plurality of 3-D training images, to obtain a plurality of pre-processed training images 204 |

▼

| |
|---|
| Form one or more mini-batches from the plurality of pre-processed training images, based on a predefined mini-batch size, wherein each mini-batch comprises one or more pre-processed training images 206 |

▼

| |
|---|
| Train a segmentation network model, with the one or more pre-processed training images present in each mini-batch at a time, until the one or more mini-batches are completed for a predefined training epochs, to obtain a trained segmentation network model, wherein the segmentation network model comprises a generator and a patch-based discriminator (208), and training the segmentation network model with the one or more pre-processed training images present in each mini-batch comprises: |
| passing each pre-processed training image present in the mini-batch to an encoder network of the generator, to obtain a set of patched feature maps and a set of encoded feature maps, corresponding to the pre-processed training image 208a |
| ▼ |
| channel-wise concatenating the set of patched feature maps and the set of encoded feature maps, through a bottleneck network of the generator, to obtain a concatenated feature map corresponding to each pre-processed training image 208b |

FIG. 2A

METHODS AND SYSTEMS FOR AUTOMATED IMAGE SEGMENTATION OF ANATOMICAL STRUCTURE

PRIORITY CLAIM

This U.S. patent application claims priority under 35 U.S.C. § 119 to: Indian Patent Application No. 202221037838, filed on Jun. 30, 2022. The entire contents of the aforementioned application are incorporated herein by reference.

TECHNICAL FIELD

The disclosure herein generally relates to the field of image segmentation, and more specifically to methods and systems for automated image segmentation of an anatomical structure such as heart.

BACKGROUND

Segmentation of images associated with anatomical structures such as heart, lungs etc., finds many applications in medical imaging field for diagnosis, treatment and so on. These anatomical structures are very sensitive and complex and demands analysis of till last slice image. However conventional techniques in the art including sophisticated and deep learning techniques are limited and inaccurate in the image segmentation till the last slice.

For example, cardiovascular diseases are one of the most fatal diseases in the world. Quantification of volumetric changes in the heart during the cardiac cycle is essential for the diagnosis and monitoring of diseases. Clinical manifestation of the cardiac structure such as changes in size, mass, geometry, regional wall motion, and function of the heart can be assessed timely and monitored non-invasively by cardiovascular magnetic resonance imaging (CMRI). Cardiac image segmentation plays a vital role in the diagnosis of cardiac diseases, quantification of volume, and image-guided interventions. Accurate delineation of the left ventricular (LV) endocardium and epicardium, and the right ventricular (RV) endocardium for both end-diastolic (ED) and end-systolic (ES) phases are particularly valuable for the extraction of ventricular function information such as stroke volume, ejection fraction, myocardium thickness, etc.

Segmentation of cine magnetic resonance (MR) image is very challenging as these images are highly anisotropic, poor contrast between myocardium and surrounding structures, brightness heterogeneities due to blood flow in left and right ventricular cavities, inherent noise due to motion artifacts, heart dynamics, and cardiac diseases may cause intensity and shape variations in patient anatomy. Manual delineation is time-consuming, tedious and prone to high intra- and interobserver variability. Automatic and reliable segmentation is highly sought out for accurate diagnosis of anomalies from volumetric data.

Most of the techniques in literature are using 2-D or slice by-slice data due to lightweight and need of less data for training. These networks lack 3-D contextual information. It has been reported that segmentation of few cardiac substructures from basal slices are difficult and erroneous from 2-D images as they occupy a small region. Further, there are some techniques exist that deals with the 3-D images for the segmentation task. However, most of the techniques are inaccurate and inefficient in the image segmentation till the last slice of the image.

SUMMARY

Embodiments of the present disclosure present technological improvements as solutions to one or more of the above-mentioned technical problems recognized by the inventors in conventional systems.

In an aspect, a processor-implemented method for automated image segmentation of an anatomical structure is provided. The method including the steps of: receiving a plurality of 3-dimensional (3-D) training images corresponding to the anatomical structure and a ground-truth 3-D image associated with each of the plurality of 3-D training images, wherein the plurality of 3-D training images is associated with a plurality of classes of the anatomical structure; pre-processing the plurality of 3-D training images, to obtain a plurality of pre-processed training images; forming one or more mini-batches from the plurality of pre-processed training images, based on a predefined mini-batch size, wherein each mini-batch comprises one or more pre-processed training images; training a segmentation network model, with the one or more pre-processed training images present in each mini-batch at a time, until the one or more mini-batches are completed for a predefined training epochs, to obtain a trained segmentation network model, wherein the segmentation network model comprises a generator and a patch-based discriminator, and training the segmentation network model with the one or more pre-processed training images present in each mini-batch comprises: passing each pre-processed training image present in the mini-batch to an encoder network of the generator, to obtain a set of patched feature maps and a set of encoded feature maps, corresponding to the pre-processed training image; channel-wise concatenating the set of patched feature maps and the set of encoded feature maps, through a bottleneck network of the generator, to obtain a concatenated feature map corresponding to each pre-processed training image; passing the concatenated feature map to a decoder network of the generator, to predict a segmented image corresponding to each pre-processed training image; predicting a probability value corresponding to each pre-processed training image, by using (i) the predicted segmented image corresponding to the pre-processed training image and (ii) the ground-truth 3-D image of the corresponding pre-processed training image, through the patch-based discriminator; calculating a value of a loss function of the segmentation network model, for the one or more pre-processed training images present in the mini-batch, using the predicted probability value corresponding to each pre-processed training image; and backpropagating weights of the segmentation network model, based on the calculated value of the loss function of the segmentation network model; receiving an input 3-D training image corresponding to the anatomical structure for the segmentation; passing the input 3-D training image, to the trained segmentation model, to predict the segmented image corresponding to the input 3-D training image of the anatomical structure; obtaining one or more domain features of the predicted segmented image corresponding to the input 3-dimensional training image, using a domain feature extraction technique; and passing the one or more domain features of the predicted segmented image, to a classification network model, to predict a classification having a plurality of anomaly classes.

In another aspect, a system for automated image segmentation of an anatomical structure is provided. The system includes: a memory storing instructions; one or more Input/Output (I/O) interfaces; and one or more hardware processors coupled to the memory via the one or more I/O interfaces, wherein the one or more hardware processors are configured by the instructions to: receive a plurality of 3-dimensional (3-D) training images corresponding to the anatomical structure and a ground-truth 3-D image associated with each of the plurality of 3-D training images, wherein the plurality of 3-D training images is associated with a plurality of classes of the anatomical structure; pre-process the plurality of 3-D training images, to obtain a plurality of pre-processed training images; form one or more mini-batches from the plurality of pre-processed training images, based on a predefined mini-batch size, wherein each mini-batch comprises one or more pre-processed training images; train a segmentation network model, with the one or more pre-processed training images present in each mini-batch at a time, until the one or more mini-batches are completed for a predefined training epochs, to obtain a trained segmentation network model, wherein the segmentation network model comprises a generator and a patch-based discriminator, and training the segmentation network model with the one or more pre-processed training images present in each mini-batch comprises: passing each pre-processed training image present in the mini-batch to an encoder network of the generator, to obtain a set of patched feature maps and a set of encoded feature maps, corresponding to the pre-processed training image; channel-wise concatenating the set of patched feature maps and the set of encoded feature maps, through a bottleneck network of the generator, to obtain a concatenated feature map corresponding to each pre-processed training image; passing the concatenated feature map to a decoder network of the generator, to predict a segmented image corresponding to each pre-processed training image; predicting a probability value corresponding to each pre-processed training image, by using (i) the predicted segmented image corresponding to the pre-processed training image and (ii) the ground-truth 3-D image of the corresponding pre-processed training image, through the patch-based discriminator; calculating a value of a loss function of the segmentation network model, for the one or more pre-processed training images present in the mini-batch, using the predicted probability value corresponding to each pre-processed training image; and backpropagating weights of the segmentation network model, based on the calculated value of the loss function of the segmentation network model; receive an input 3-D training image corresponding to the anatomical structure for the segmentation; pass the input 3-D training image, to the trained segmentation model, to predict the segmented image corresponding to the input 3-D training image of the anatomical structure; obtain one or more domain features of the predicted segmented image corresponding to the input 3-dimensional training image, using a domain feature extraction technique; and pass the one or more domain features of the predicted segmented image, to a classification network model, to predict a classification having a plurality of anomaly classes.

In yet another aspect, there are provided one or more non-transitory machine-readable information storage mediums comprising one or more instructions which when executed by one or more hardware processors cause: receiving a plurality of 3-dimensional (3-D) training images corresponding to the anatomical structure and a ground-truth 3-D image associated with each of the plurality of 3-D training images, wherein the plurality of 3-D training images is associated with a plurality of classes of the anatomical structure: pre-processing the plurality of 3-D training images, to obtain a plurality of pre-processed training images; forming one or more mini-batches from the plurality of pre-processed training images, based on a predefined mini-batch size, wherein each mini-batch comprises one or more pre-processed training images; training a segmentation network model, with the one or more pre-processed training images present in each mini-batch at a time, until the one or more mini-batches are completed for a predefined training epochs, to obtain a trained segmentation network model, wherein the segmentation network model comprises a generator and a patch-based discriminator, and training the segmentation network model with the one or more pre-processed training images present in each mini-batch comprises: passing each pre-processed training image present in the mini-batch to an encoder network of the generator, to obtain a set of patched feature maps and a set of encoded feature maps, corresponding to the pre-processed training image; channel-wise concatenating the set of patched feature maps and the set of encoded feature maps, through a bottleneck network of the generator, to obtain a concatenated feature map corresponding to each pre-processed training image; passing the concatenated feature map to a decoder network of the generator, to predict a segmented image corresponding to each pre-processed training image; predicting a probability value corresponding to each pre-processed training image, by using (i) the predicted segmented image corresponding to the pre-processed training image and (ii) the ground-truth 3-D image of the corresponding pre-processed training image, through the patch-based discriminator; calculating a value of a loss function of the segmentation network model, for the one or more pre-processed training images present in the mini-batch, using the predicted probability value corresponding to each pre-processed training image; and backpropagating weights of the segmentation network model, based on the calculated value of the loss function of the segmentation network model; receiving an input 3-D training image corresponding to the anatomical structure for the segmentation; passing the input 3-D training image, to the trained segmentation model, to predict the segmented image corresponding to the input 3-D training image of the anatomical structure; obtaining one or more domain features of the predicted segmented image corresponding to the input 3-dimensional training image, using a domain feature extraction technique; and passing the one or more domain features of the predicted segmented image, to a classification network model, to predict a classification having a plurality of anomaly classes.

In an embodiment, pre-processing each 3-dimensional training image to obtain a corresponding pre-processed training image, comprising: sequentially performing at least one of: (i) an image orientation normalization, (ii) a region of interest (ROI) extraction, (iii) a size normalization, (iv) a pixel value normalization, and (v) an image data augmentation, on each 3-D training image.

In an embodiment, the segmentation network model is a generative adversarial network (GAN) and comprising the generator and the patch-based discriminator, and wherein the generator comprises the encoder network, the bottleneck network, the decoder network, and a set of skip connections between the encoder network and the decoder network.

In an embodiment, the loss function of the segmentation network model for each pre-processed training image, comprises a generator loss and a discriminator loss, wherein the generator loss comprises a class-weighted generalized dice loss and an adversarial loss, and the discriminator loss comprises a real loss and a fake loss, and wherein: the class-weighted generalized dice loss is calculated between the ground-truth 3-D image of the corresponding pre-processed training image and the predicted segmented image corresponding to the pre-processed training image, wherein the class-weighted generalized dice loss is calculated using pixel-based distribution technique; the adversarial loss is calculated between the ground-truth 3-D image of the corresponding pre-processed training image and the predicted segmented image corresponding to the pre-processed training image; the real loss is calculated between the corresponding pre-processed training image and the ground-truth 3-D image of the corresponding pre-processed training image; and the fake loss is calculated between the corresponding pre-processed training image and predicted segmented image corresponding to the pre-processed training image.

In an embodiment, the class-weighted generalized dice loss is defined with one or more class weights that are associated with plurality of classes of the anatomical structure.

In an embodiment, a learning rate and a dropout of the segmentation network model are dynamically adjusted between the predefined training epochs during the training, based on the value of loss function at each predefined training epoch.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A-2C illustrates exemplary flow diagrams of a processor-implemented method for automated image segmentation of the anatomical structure, in accordance with some embodiments of the present disclosure.

DETAILED DESCRIPTION

Figure 1:
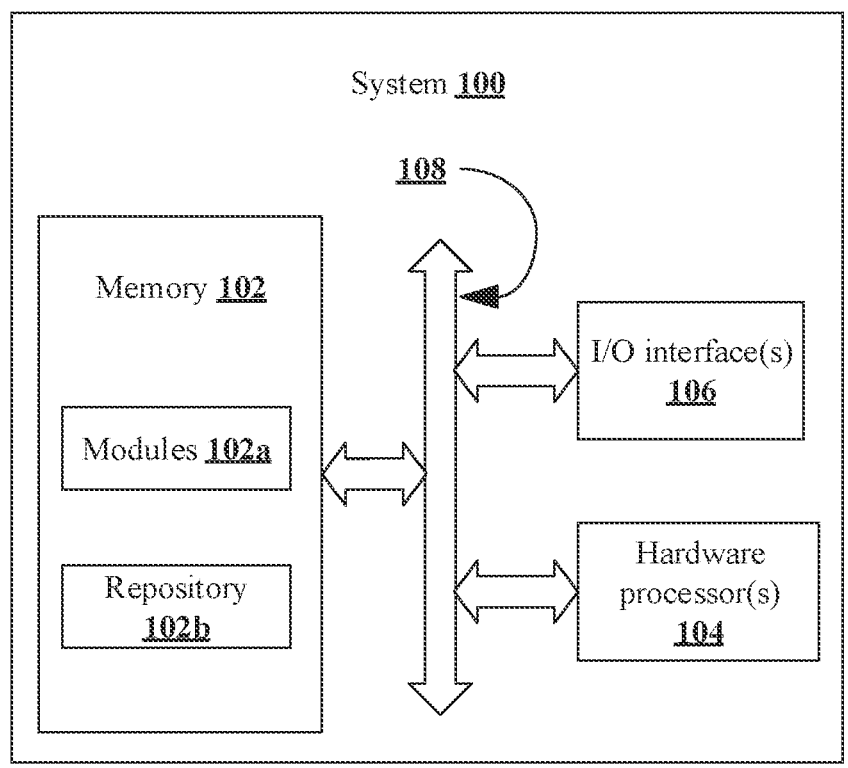
FIG. 1 is an exemplary block diagram of a system for automated image segmentation of an anatomical structure, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The segmentation process of cardiac imaging is broadly divided into two stages, i.e., localization, and segmentation. For localization some of the conventional techniques use variance, circular Hough and Fourier transforms, and so on, to locate the heart. Several techniques available to automate the segmentation of cardiac MRI using active shape models, atlas registration, etc. Recent advancements in deep learning (DL) have influenced cardiac imaging. For example, M-net-based architecture for segmenting LV, RV, and myocardium. An ensemble of U-Net inspired architectures for segmenting LV, RV, and myocardium on each time instance of cardiac cycle. A fully convolutional residual densenets for segmentation using an ensemble of classifiers. A one-stage U-Net for segmentation of heart is proposed. Further, there are challenge with outcomes of ACDC dataset with the results from DL methods provided by several research groups for the segmentation task and for the classification task.

However, most of the techniques in literature are using 2-D or slice by-slice data due to lightweight and need of less data for training. These networks lack 3-D contextual information. It has been reported that segmentation of few cardiac substructures from basal slices are difficult and erroneous from 2-D images as they occupy a small region. Further, there are some techniques exist that deals with the 3-D images for the segmentation task. However, most of the techniques are inaccurate and inefficient in the image segmentation till the last slice of the image.

The present disclosure solves the technical problems in the art for automated 3-D image segmentation of the anatomical structure such as heart, by proposing a new Generative Adversarial Network (GAN) based architecture for the segmentation (for example LV, RV, and myocardium of heart) from 3-D volume data with high accuracy. The proposed 3-D GAN based architecture is capable of storing the 3-D contextual information for the image segmentation of the anatomical structure.

Referring now to the drawings, and more particularly to FIG. 1 through FIG. 7, where similar reference characters denote corresponding features consistently throughout the figures, there are shown preferred embodiments and these embodiments are described in the context of the following exemplary systems and/or methods.

FIG. 1 is an exemplary block diagram of a system 100 for automated image segmentation of an anatomical structure, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The VO interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102*a* and a repository 102*b* for storing data processed, received, and generated by one or more of the plurality of modules 102*a*. The plurality of modules 102*a* may include routines, programs, objects, components, data structures, and so on, which perform particular tasks or implement particular abstract data types.

The plurality of modules 102*a* may include programs or computer-readable instructions or coded instructions that supplement applications or functions performed by the system 100. The plurality of modules 102*a* may also be used as, signal processor(s), state machine(s), logic circuitries, and/or any other device or component that manipulates signals based on operational instructions. Further, the plurality of modules 102*a* can be used by hardware, by computer-readable instructions executed by the one or more hardware processors 104, or by a combination thereof. In an embodiment, the plurality of modules 102*a* can include various sub-modules (not shown in FIG. 1). Further, the memory 102 may include information pertaining to input(s)/output(s) of each step performed by the processor(s) 104 of the system 100 and methods of the present disclosure.

The repository 102*b* may include a database or a data engine. Further, the repository 102*b* amongst other things, may serve as a database or includes a plurality of databases for storing the data that is processed, received, or generated as a result of the execution of the plurality of modules 102*a*. Although the repository 102*b* is shown internal to the system 100, it will be noted that, in alternate embodiments, the repository 102*b* can also be implemented external to the system 100, where the repository 102*b* may be stored within an external database (not shown in FIG. 1) communicatively coupled to the system 100. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102*b* may be distributed between the system 100 and the external database.

Figure 2B:
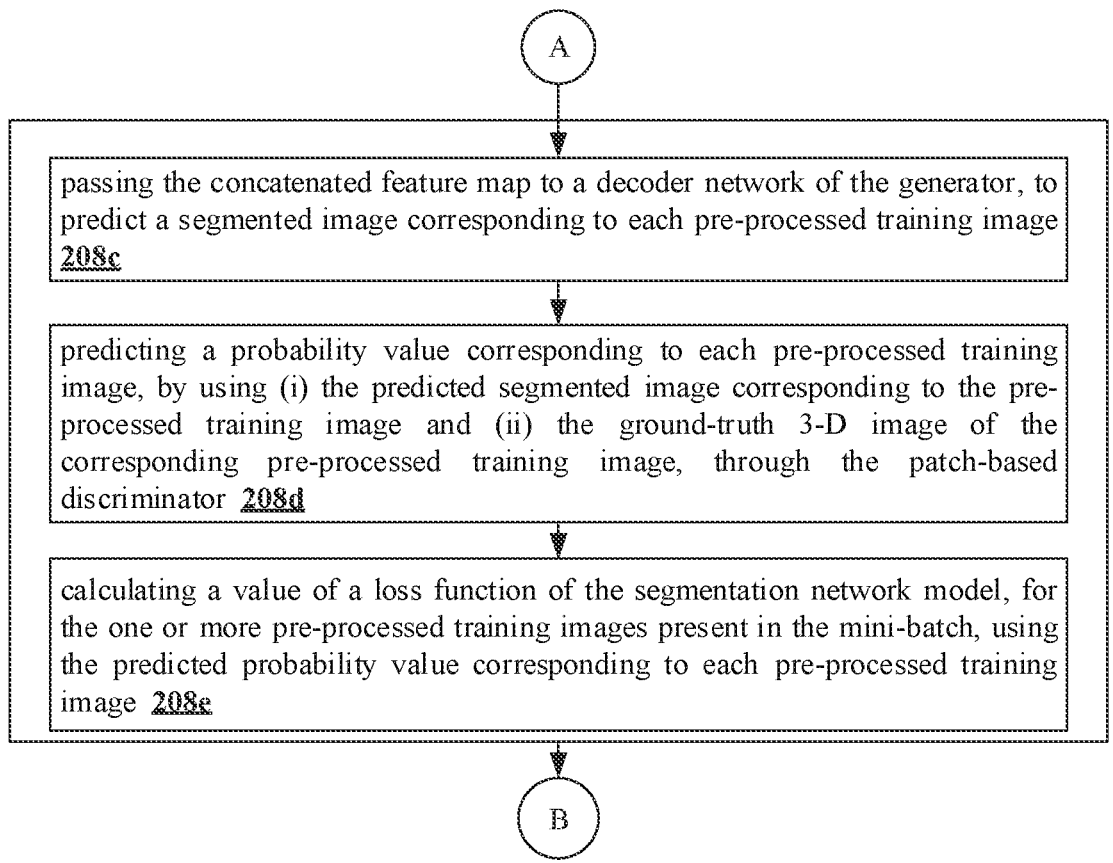
Figure 2C:
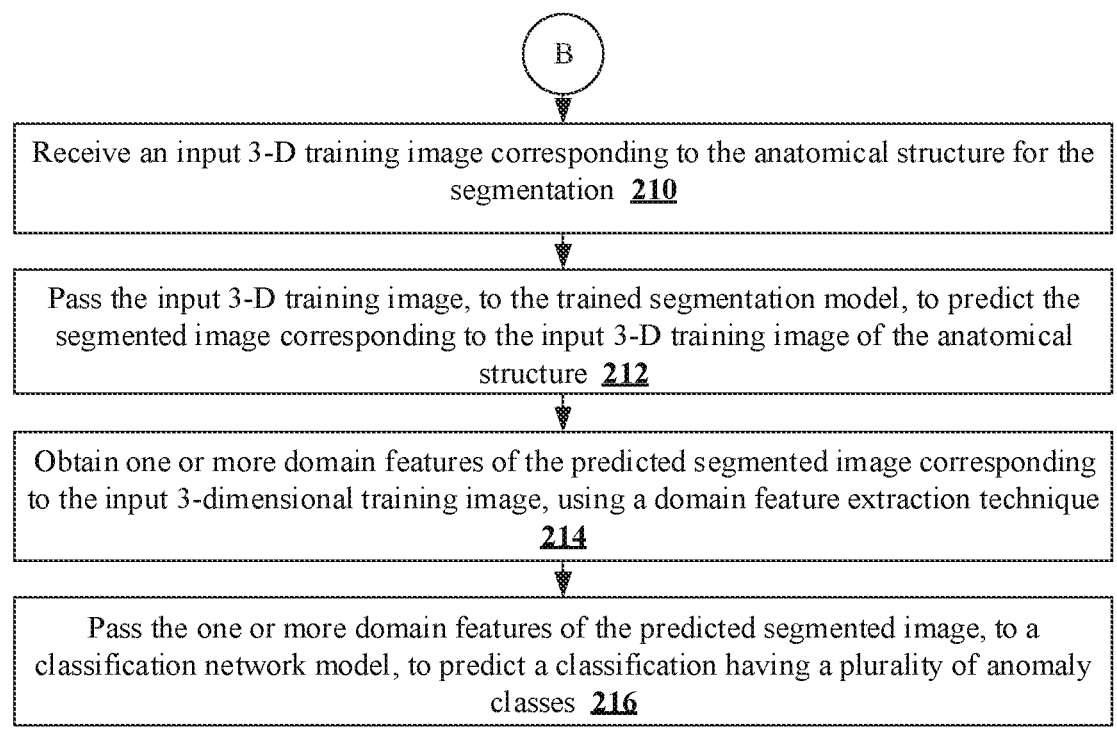

Referring to FIGS. 2A-2C, components and functionalities of the system 100 are described in accordance with an example embodiment of the present disclosure. FIGS. 2A-2C illustrates exemplary flow diagrams of a processor-implemented method 200 for automated image segmentation of the anatomical structure, in accordance with some embodiments of the present disclosure. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 202 of the method 200, the one or more hardware processors 104 of the system 100 are configured to receive a plurality of 3-dimensional (3-D) training images corresponding to the anatomical structure and a ground-truth 3-D image associated with each of the plurality of 3-D training images. The plurality of 3-D training images is associated with a plurality of classes of the anatomical structure.

For example, the plurality of classes is associated with the plurality of substructures of the anatomical structure. For example, in case of heart, the plurality of classes (substructures) includes a left ventricular (LV), a right ventricular (RV) and a myocardium, that are interested in for the segmentation. The ground-truth 3-D image associated with each of the plurality of 3-D training images, refers to the segmented image of the associated anatomical structure.

The plurality of 3-dimensional (3-D) training images are received may in the form including but are not limited to magnetic resonance imaging (MRI), computerized tomography (CT) or any other 3-D form. In an embodiment, each 3-D training image includes 4 channels of size 160×160× 16×4. In an embodiment, the plurality of 3-dimensional (3-D) training images and the corresponding ground-truth 3-D images are stored in a repository 102*b* of the system 100.

At step 204 of the method 200, the one or more hardware processors 104 of the system 100 are configured to pre-process the plurality of 3-D training images received at step 202 of the method 200, to obtain a plurality of pre-processed training images. Each 3-D training image of the plurality of 3-D training images, is pre-processed to obtain the corresponding pre-processed training image and the plurality of pre-processed training images are obtained from the plurality of 3-D training images.

In an embodiment, pre-processing each 3-dimensional training image, to obtain the corresponding pre-processed training image, comprising: sequentially performing at least one of: (i) an image orientation normalization, (ii) a region of interest (ROI) extraction, (iii) a size normalization, (iv) a pixel value normalization, and (v) an image data augmentation, on each 3-D training image.

The on-the-go 3-D image data augmentation is performed to increase the data size and reduce the storage dependency. In an embodiment, the on-the-go 3-D image data augmentation comprises: (i) flipping the image over one of the three axes x, y and z, (ii) rotating the image over x, y and z-axis randomly between 0-30 degrees, (iii) deforming the image using elastic deformation, and (iv) altering the brightness of the image using a power-law gamma transformation.

At step 206 of the method 200, the one or more hardware processors 104 of the system 100 are configured to form one or more mini-batches from the plurality of pre-processed training images, based on a predefined mini-batch size. Each mini-batch includes one or more pre-processed training images out of the plurality of pre-processed training images obtained at step 204 of the method 200. For example, if number of the plurality of pre-processed training images is 1000 and if the predefined mini-batch size is 16, then each mini-batch includes 16 pre-processed training images. In an embodiment, the single pre-processed training image is not be part of the multiple mini-batches, i.e., each mini-batch comprises unique pre-processed training images.

It is implicit that the number of the one or more pre-processed training images present in last mini-batch may or may not be equal to the predefined mini-batch size, based on the number of remaining samples available. In an embodiment, the predefined mini-batch size is defined based on the resource availability such as hardware, graphic processing unit (GPU) capacity, and memory present in the system 100.

At step 208 of the method 200, the one or more hardware processors 104 of the system 100 are configured to train a segmentation network model, with the one or more pre-processed training images present in each mini-batch at a time. The training of the segmentation network model is performed until the one or more mini-batches are completed for a predefined training epochs, to obtain a trained segmentation network model. If the training of the segmentation network model is completed with all the one or more mini-batches, then it is termed as one training epoch and in the next training epoch, again the one or more mini-batches are formed for the training.

In an embodiment, the one or more pre-processed training images present in one mini-batch associated with one training epoch, need not be same to that of the one or more pre-processed training images present in another mini-batch associated with another training epoch. However, the predefined mini-batch size is uniform across all the training epochs. In an embodiment, the predefined training epochs is 2500.

Figure 3:
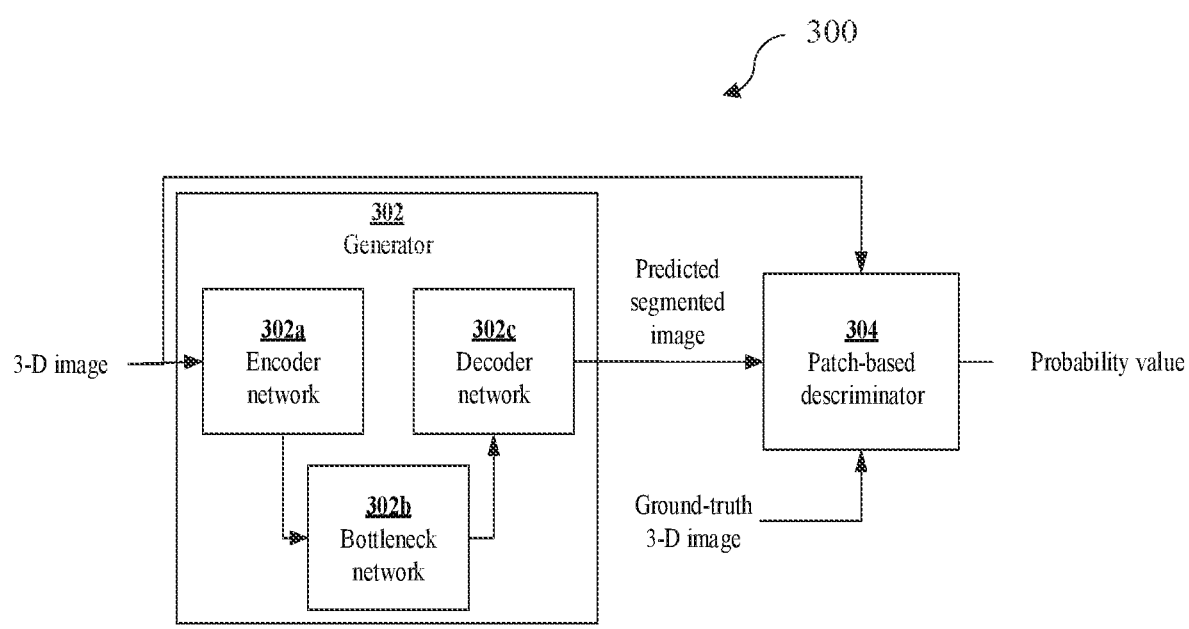
FIG. 3 shows a high-level block diagram of the segmentation network model, in accordance with some embodiments of the present disclosure.

FIG. 3 shows a high-level block diagram of the segmentation network model 300, in accordance with some embodiments of the present disclosure. As shown in FIG. 3, the segmentation network model is a generative adversarial network (GANs) and includes a generator 302 and a patch-based discriminator 304 pitted one against the other. The generative adversarial network (GANs) is used to generate new synthetic instances of data that can pass for the real data. The generator 302 further includes an encoder network 302a, the bottleneck network 302b, and the decoder network 302c. The encoder network 302a and the decoder network 302c are connected to the bottleneck network 302b. Further, a set of skip connections (not shown in FIG. 3) between the encoder network 302a and the decoder network 302c.

Figure 4:
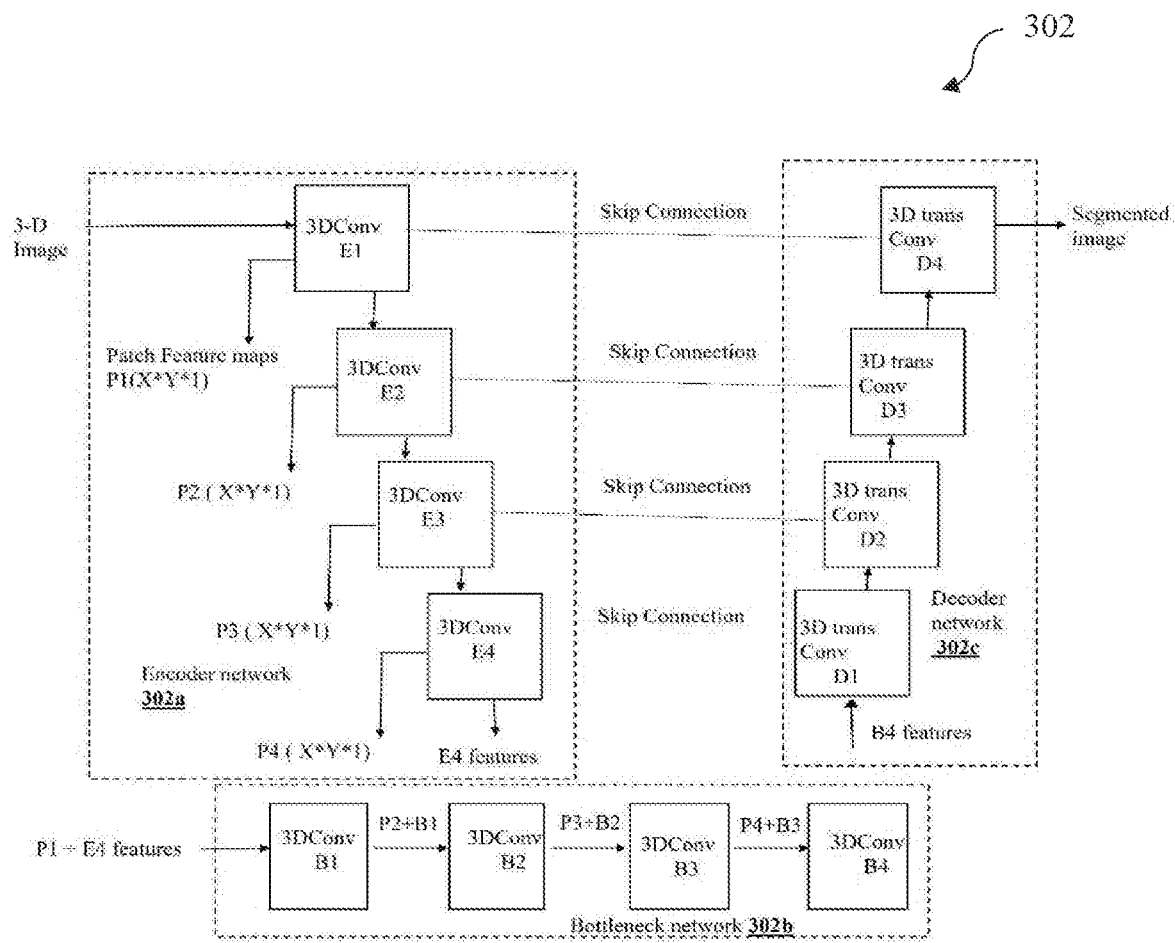
FIG. 4 shows an exemplary block diagram of the generator, in accordance with some embodiments of the present disclosure.

FIG. 4 shows an exemplary block diagram of the generator 302, in accordance with some embodiments of the present disclosure. As shown in FIG. 4, the encoder network 302a includes four 3-D convolutional blocks namely 3DConv E1, 3DConv E2, 3DConv E3, and 3DConv E4. The bottleneck network 302b includes four 3-D convolutional blocks namely 3DConv B1, 3DConv B2, 3DConv B3, and 3DConv B4. The decoder network 302c includes four 3-D transposed convolutional blocks namely 3D trans Conv D1, 3D trans Conv D2, 3D trans Conv D3, and 3D trans Conv D4.

Figure 5:
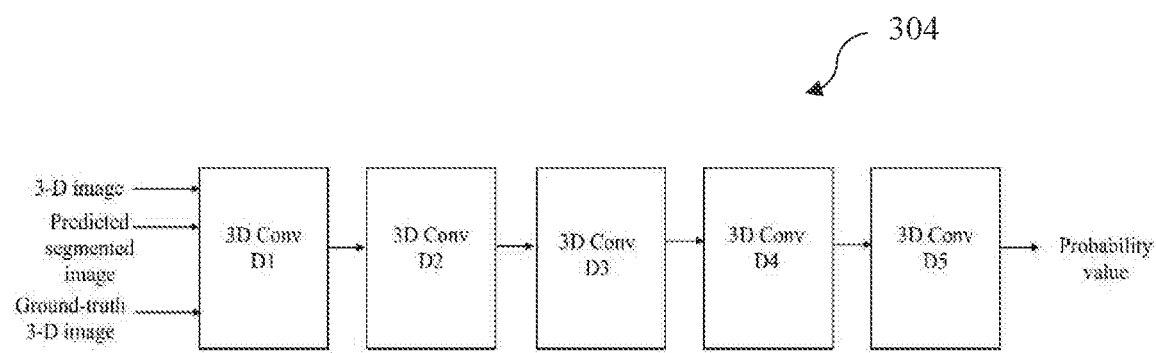
FIG. 5 shows an exemplary block diagram of the patch-based discriminator, in accordance with some embodiments of the present disclosure.

FIG. 5 shows an exemplary block diagram of the patch-based discriminator 304, in accordance with some embodiments of the present disclosure. As shown in FIG. 5, the patch-based discriminator 304 includes five 3-D convolutional blocks namely 3DConv D1, 3DConv D2, 3DConv D3, 3DConv D4, and 3DConv D5.

Each 3-D convolutional block ((i) of the four 3-D convolutional blocks namely 3DConv E1, 3DConv E2, 3DConv E3, and 3DConv E4 of the encoder network 302, or (ii) of the four 3-D convolutional blocks namely 3DConv B1, 3DConv B2, 3DConv B3, and 3DConv B4 of the bottleneck network 302b, or (iii) of the four 3-D transposed convolutional blocks namely 3D trans Conv D1, 3D trans Conv D2, 3D trans Conv D3, and 3D trans Conv D4 of the decoder network 302c) contain an identical layer structure comprising a convolutional layer, a padding layer, a pooling or stride layer, a batch normalisation layer, an activation function, and a dropout layer.

Now, the training of segmentation network model 300 with the one or more pre-processed training images present in each mini-batch is explained in detail through steps 208a through 208f. At step 208a, each pre-processed training image present in the mini-batch is passed to the encoder network 302a, to obtain a set of patched feature maps and a set of encoded feature maps, corresponding to the pre-processed training image.

More specifically, the set of patched feature maps and the set of encoded feature maps, are obtained for each pre-processed training image. As shown in FIG. 4, each pre-processed training image is in specific passed to the first 3-D convolutional block 3DConv E1. The patched feature maps are extracted from each four 3-D convolutional blocks namely 3DConv E1, 3DConv E2, 3DConv E3, and 3DConv E4. From FIG. 4, the patched feature maps $P1(X \times Y \times 1)$ are extracted from the 3-D convolutional block 3DConv E1. Similarly, the patched feature maps $P2(X \times Y \times 1)$ are extracted from the 3-D convolutional block 3DConv E2, the patched feature maps $P3(X \times Y \times 1)$ are extracted from the 3-D convolutional block 3DConv E3, and the patched feature maps $P4(X \times Y \times 1)$ are extracted from the 3-D convolutional block 3DConv E4. In an embodiment, the $P2(X \times Y \times 1)$ the value of X and Y is 10.

The patched feature maps $P1(X \times Y \times 1)$, $P2(X \times Y \times 1)$, $P3(X \times Y \times 1)$, and $P4(X \times Y \times 1)$ extracted from respective four 3-D convolutional blocks of the encoder network 302a, forms the set of patched feature maps for the corresponding to the pre-processed training image. Also, the set of encoded feature maps are extracted for the corresponding to the pre-processed training image, from the last 3-D convolutional block 3DConv E4.

In an embodiment, the size of the patched feature maps $P1(X \times Y \times 1)$ is $10 \times 10 \times 1$ and such patched feature maps are extracted from each of the four 3-D convolutional blocks of the encoder network 302a. Further, each of the four 3-D convolutional blocks of the encoder network 302a includes a 3-D down-sampling convolutional layers with a kernel of $4 \times 4 \times 4$, stride 2, and with a leaky RELU activation function. A normal distribution is as the initial distribution of the encoder network 302a, centered on 0 with standard deviation=$\sqrt{2/I}$ where I is the number of input units in the weight tensor.

At step 208b, the set of patched feature maps (P1(X×Y×1), P2(X×Y×1), P3(X×Y×1), and P4(X×Y×1)) and the set of encoded feature maps (from the last 3-D convolutional block 3DConv E4) of each pre-processed training image, obtained at step 208a, are concatenated channel-wise through the bottleneck network 302b, to obtain a concatenated feature map for the corresponding pre-processed training image. As shown in FIG. 4, the patched feature map P1(X×Y×1) and the set of encoded feature maps (from the last 3-D convolutional block 3DConv E4) are concatenated first through the first 3-D convolutional block 3DConv B1 of the bottleneck network 302b, to obtain first intermediate feature maps.

Then, the first intermediate feature maps and the patched feature map P2(X×Y×1) are concatenated through the second 3-D convolutional block 3DConv B2 to obtain second intermediate feature maps. Next, the second intermediate feature maps and the patched feature map P3(X×Y×1) are concatenated through the third 3-D convolutional block 3DConv B3 to obtain third intermediate feature maps. Lastly, the third intermediate feature maps and the patched feature map P4(X×Y×1) are concatenated through the fourth 3-D convolutional block 3DConv B4 to obtain the concatenated feature map for the corresponding pre-processed training image. Hence the concatenated feature map is obtained for each pre-processed training image present in the mini-batch at this step.

The bottleneck network 302b includes 3-D convolution layer with kernel size, distribution, and activation function similar to the encoder network 302a, but with stride 1. The 3-D convolution layers in the bottleneck network 302b help by reducing the number of parameters in the network (302b) but still allowing it to be deep, representing many feature maps. The depth of the bottleneck network 302b and the encoder network 302a are identical, as feature maps of X×Y×1 (for example, 10×10×1) from each encoder network output layer are concatenated with each bottleneck layer using the patch extraction. Skip-connections between the encoder network 302a and the decoder network 302c are also applied. The skip connections and the bottleneck network 302b helps in the addition of the lost features during down-sampling and thereby preserving the specific and crucial information which is essential in the medical image domain.

At step 208c, the concatenated feature map of each pre-processed training image, obtained at step 208b, is passed to the decoder network 302c, to predict a segmented image corresponding to each pre-processed training image. More specifically, the concatenated feature map of each pre-processed training image is passed to the first 3-D transposed convolutional block 3D trans Conv D1 of the decoder network 302c. The predicted segmented image corresponding to each pre-processed training image is obtained from the last 3-D transposed convolutional block 3D trans Conv D4 of the decoder network 302c. Hence the predicted segmented image is obtained for each pre-processed training image present in the mini-batch at this step.

The decoder network 302c includes 3-D transpose up-sampling layers with the rest similar to the encoder network 302a. As the segmentation network model 300 is the segmented network and the classifier network, the last output layer is a 3-D transpose layer with 4×4×4, stride 2 with soft-max activation function for segmenting and classifying the substructures of the anatomical structure (For example, the 4 substructures of the heart include LV, RV, Myocardium, and the background).

At step 208d, a probability value corresponding to each pre-processed training image, is predicted, through the patch-based discriminator 304. For predicting the probability value corresponding to each pre-processed training image, (i) the predicted segmented image corresponding to the pre-processed training image obtained at step 208c, and (ii) the ground-truth 3-D image of the corresponding pre-processed training image received at step 202 of the method 200, are passed to the patch-based discriminator 304.

The patch-based discriminator 304 includes the 3-D convolutional layers with parameters similar to the encoder network 302a of the generator 302. The patch-based discriminator 304 is built on patch GAN architecture style. The patch-based discriminator 304 takes two inputs, the original image and the predicted segmented image output from the generator 302. The patch-based discriminator 304 splits the raw input image into local small patches of size with 24×24×6, then runs a general discriminator convolutionally on every patch declaring whether the patch is real or fake. The final prediction is the average of all the patch responses, At step 208e, a value of a loss function of the segmentation network model 300 is calculated, for the one or more pre-processed training images present in each mini-batch, using the predicted probability value corresponding to each pre-processed training image obtained at step 208d. The value of the loss function of the segmentation network model is first calculated for each pre-processed training image present in the mini-batch and the value of the loss function is then aggregated for all the pre-processed training images present in the mini-batch.

In an embodiment, the loss function of the segmentation network model 300 for each pre-processed training image, is a summation of a generator loss ($L_G$) and a discriminator loss ($L_D$). The generator loss ($L_G$) comprises a class-weighted generalized dice loss and an adversarial loss. The discriminator loss comprises a real loss and a fake loss. The class-weighted generalized dice loss is calculated between the ground-truth 3-D image of the corresponding pre-processed training image and the predicted segmented image corresponding to the pre-processed training image, wherein the class-weighted generalized dice loss is calculated using pixel-based distribution technique. The adversarial loss is calculated between the ground-truth 3-D image of the corresponding pre-processed training image and the predicted segmented image corresponding to the pre-processed training image.

The class weights are incorporated while calculating the class-weighted generalized dice loss of the generator 302, to resolve the bad training of a certain class due to the class imbalance problem of especially some of the classes of the segmentation (For example, myocardium in the heart) in the classification network of the generator 302. This ensures that minority class can be detected correctly. These class weights are computed based on the plurality of 3-dimensional (3-D) training images (training dataset in general) received at step 202 of the method 200.

The class-weighted generalized dice loss is defined with one or more class weights that are associated with plurality of classes of the anatomical structure. The generator loss ($L_G$) is mathematically represented as in equation 1:

$$L_G = MSE(D0_1(Ori, \text{Pred})) + \propto * GDL(gt, G_{pred}) \quad (1)$$

where GDL (gt, $G_{pred}$) represents the class-weighted generalized dice loss, MSE ($D0_1$(Ori, Pred)) represents the adversarial loss, MSE is the mean square error, $D0_1$ is the patch-based discriminator output with the tensor of ones, Ori is the actual image (3-D training image of the plurality of 3-dimensional (3-D) training images received at step 202), Pred is the respective predicted output, gt is the corresponding ground-truth 3-D image received at step 202, and $G_{pred}$ is the segmented predicted output of the decoder network 302c (from the generator 302), $\propto$ is a crucial hyperparameter, which is a scalar coefficient that works as a regularization parameter and the penalizes the network accordingly. In embodiment, the values of $\propto$ is chosen as 8 based on the experimental analysis.

In an embodiment, the class-weighted generalized dice loss is calculated using equation 2:

$$\text{Dice loss} = 1 - \text{dice cofficient} \quad (2)$$

and the dice cofficient is calculated using equation 3:

$$\text{Dice cofficient} = \frac{2|A \cap B|}{|A| + |B|} \times \text{class weights} \quad (3)$$

wherein, $|A \cap B|$ is element wise multiplication between the predicted segmented image and the ground truth image and then sum the resulting matrix, and $|A|+|B|$ represents a total pixels sum of the predicted segmented image and the ground truth image.

Class weights are calculated as follows: Suppose there are P number of the plurality of 3-dimensional (3-D) training images $\{I_1, I_2, I_3, I_4, \ldots, I_p\}$ and j number of unique labels $\{\alpha_1, \alpha_2, \alpha_3, \alpha_4, \ldots, \alpha_j\}$ considering j substructures in each 3-D training image, then weight of the label j in $i^{th}$ 3-D training image is represented as $W\alpha_{ji}$ and defined as in equation 4:

$$W a_{ji} = \frac{\sum_m : m \text{ pixels of label } a_j \text{ distributed over image } i}{\sum_N : N \text{ is total number of pixels in image } i} \quad (4)$$

Like this, the weights for each 3-D training image are defined as $$I_1 = \{W\alpha_{11}, W\alpha_{21}, W\alpha_{31}, \ldots, W\alpha_{j1}\}$$

$$I_2 = \{W\alpha_{12}, W\alpha_{22}, W\alpha_{32}, \ldots, W\alpha_{j2}\}$$

$$I_i = \{W\alpha_{1i}, W\alpha_{2i}, W\alpha_{3i}, \ldots, W\alpha_{ji}\}$$

Then the total weights for all the classes are represented as in the below equation:

$$\text{Total weights} = \left[ \frac{\sum (Wa_{11}, Wa_{12}, \ldots, Wa_{1i})}{i}, \frac{\sum (Wa_{21}, Wa_{22}, \ldots, Wa_{2i})}{i}, \ldots, \frac{\sum (Wa_{j1}, Wa_{j2}, \ldots, Wa_{ji})}{i} \right]$$

The real loss is calculated between the corresponding pre-processed training image and the ground-truth 3-D image of the corresponding pre-processed training image. The fake loss is calculated between the corresponding pre-processed training image and predicted segmented image corresponding to the pre-processed training image.

The discriminator loss ($L_D$) is mathematically represented as in equation 5:

$$L_G = 0.5 * (L_R + L_F) \quad (5)$$

wherein $L_R$ is the real loss and $L_F$ is the fake loss.

The idea of patch-based discriminator is to split the raw input image into some small local patches, run a general discriminator convolutionally on every patch, and average all the responses to obtain the final output indicating whether the input image is fake or not. The main difference between the patch-based discriminator and a regular GAN discriminator is that the latter maps an input image to a single scalar output in the range of [0,1], indicating the probability of the image being real or fake, while the patch-based discriminator provides an array as the output with each entry signifying whether its corresponding patch is real or fake.

At step 208f, the weights of the segmentation network model 300, are backpropagated based on the calculated value of the loss function of the segmentation network model 300, obtained at step 208e. Like this, the training of the segmentation network model 300, is performed until the one or more mini-batches are completed for the predefined training epochs, to obtain the trained segmentation network model.

The trained segmentation model obtained at step 208 of the method 200 is then used for various applications where the segmentation image of the anatomical structure is required, and especially where the last slice of the anatomical structure such as heart, is of high importance. At step 210 of the method 200, the one or more hardware processors 104 of the system 100 are configured to receive an input 3-D training image corresponding to the anatomical structure for which the segmentation is required. The received input 3-D training image is pre-processed as explained at step 204 of the method 200 and the pre-processed input 3-D training image is obtained.

At step 212 of the method 200, the one or more hardware processors 104 of the system 100 are configured to pass the pre-processed input 3-D training image, to the trained segmentation model obtained at step 208 of the method 200, to predict the segmented image corresponding to the input 3-D training image of the anatomical structure. It is implicit that the pre-processed input 3-D training image is passed to the encoder network 302a of the trained segmentation model and the predicted segmented image corresponding to the input 3-D training image is obtained from the decoder network 302c of the trained segmentation model.

A learning rate and a dropout of the segmentation network model 300 are dynamically adjusted between the predefined training epochs during the training, based on the value of the loss function at each predefined training epoch. The generator uses an Adam optimizer with a learning rate ($l_r$) of $2e^{-4}$ and a beta of 0.5. The discriminator has RMSprop with $l_r$ of $1e^{-3}$, ρ, which is the discounting factor for the coming gradient is set to 0.5. Different dropout values are applied to both networks of the generator and the discriminator. The generator has a lower dropout of 0.3 as compared to the discriminator that has 0.5. By giving a higher dropout to the discriminator results in more dynamic so that it does not go to mode collapse, a common problem while training the GAN. Also, the low dropout to the generator helps in convergence and avoids vanishing gradient problem.

The predicted segmented image corresponding to the anatomical structure in this step only gives the segmented information such as type of segments (for example, the left ventricular (LV), the right ventricular (RV) and the myocardium of the heart) present in the segmented image. However, the anomalies in the segments (substructures) are unknown. Hence it is important to classify the anomaly substructures in the predicted segmented image corresponding to the anatomical structure. For this, at step 214 of the method 200, the one or more hardware processors 104 of the system 100 are configured to obtain one or more domain features of the predicted segmented image corresponding to the input 3-dimensional training image. A domain feature extraction technique is employed to extract the one or more domain features of the predicted segmented image corresponding to the anatomical structure.

In an embodiment, the domain features are derived from the segmented areas in the predicted segmented image. The domain features can be used as clinical values that aids in diagnosis or can be used as a feature to automate algorithms that detect anomalies. For example, in case of heart, the standard clinical values like ejection fraction, myocardial mass, volume information for disease classification, etc. Some of the standard clinical value used in literature are given below:

(i) A stroke volume (SV) is defined as the volume ejected between the end of diastole and the end of systole.

$$SV = EDV - ESV$$

wherein, the EDV is an end-diastolic volume and the ESV is an end-systolic volume.

(ii) A LV Mass is the density of cardiac muscle is about 1.05 g/mL and the LV mass can be computed as LV myocardial volume×1.05.

(iii) Ejection fraction (EF) is a measurement, expressed as a percentage, of how much blood the left ventricle pumps out with each contraction.

$$EF\,(\%) = \frac{SV}{EDV} \times 100$$

(iv) Body Surface Area (BSA): Normalisation of the derived physiological values is done using BSA. This is calculated using Mosteller's formula given below:

$$BSA(m^2) = \sqrt{\frac{[height\,(cm) \times weight\,(kg)]}{3600}}$$

The standard features mostly include used volumes of LV, RV, and Myocardium during ES and ED phases, stroke volume for LV and RV, height, weight etc. The domain features may also be textural, geometrical, and radiomics approach-based features. In some pathologies, the difference in volume plays a critical role in the identification of dilated cardiomyopathy as LV volume is more than the myocardium volume in the ED phase. Similarly, for hypertrophic cardiomyopathy, myocardium has a significantly large volume than LV during the ED phase. Hence, the observations are incorporated during ES and ED phases across images and considered some standard, new ratio and subtraction volume features. Overall, 28 domain features are identified and shown in table 1:

TABLE 1

| Standard Features | Proposed Subtraction Features | Proposed Ratio Features |
|---|---|---|
| LVES & LVED vol | LVED − MYED (S1) | LVED/RVED (R1) |
| RVES & RVED vol | LVES − MYES (S2) | LVES/RVES (R2) |
| MYES & MYED vol | LVED − RVED (S3) | MYED/LVED (R3) |
| LV & RV SV | LVES − RVES (S4) | MYES/LVES (R4) |
| LV & RV EF | MYED − RVED (S5) | MYED/RVED (R5) |
| LV Mass (LVM) | MYES − RVES (S6) | MYES/RVES (R6) |
| Height (Ht), weight (Wt) | | MYED/MYES (R7) |
| BMI & BSA | | |

In table 1, LV mean left ventricle, RV mean right ventricle, MY mean myocardium, ES mean end-systole, ED mean end-diastole, EF mean ejection fraction, and SV mean stroke volume.

Then at 216 of the method 200, the one or more hardware processors 104 of the system 100 are configured to pass the one or more domain features of the predicted segmented image, obtained at step 214 of the method 200, to a classification network model, to predict an anomaly class of the plurality of anomaly classes associated with the anomaly substructures.

The 28 domain features are identified at step 214 of the method 200. These domain features are used for training a random forest classifier (RFC), a supervised learning technique that is a meta estimator that fits a number of decision tree classifiers on various sub-samples of the dataset, to obtain the classification network model after the training. The individual decision trees are generated using an attribute selection indicator such as information gain, which is a measure of how much information can be gathered from a piece of data.

This is based on the concept of ensemble learning, which is a process of combining multiple classifiers to solve a complex problem and also to improve the performance of the model. Each tree then votes, and the most popular class is chosen as the final result. RFC uses averaging to improve the predictive accuracy and controls over-fitting. For example, these 28 identified features are fed as input to this classifier to classify 5 classes (4 pathologies and 1 normal). The classification network model is then utilized for obtaining the anomaly classes for the input 3-dimensional training image, based on the domain features.

The patch-based feature extraction at the encoder network is concatenated with the bottleneck layers of the bottleneck network to maintain the finer and spatial details for the semantic segmentation. As the input to the GAN based segmentation network model of the present disclosure is 3-D image, it is advantage to capture and maintain minute feature details, voxel spacing and volume information. Despite being the 3-D, the segmentation network model of the present disclosure is computationally efficient. It captures contextual information and has potential to implicitly learn local dependence between the pixels. Due to the dynamic network parameters, such as the learning rate and the dropout of the segmentation network, the training process converges fast, with better segmented output and efficiently handles mode collapse and vanishing gradient problems.

The GAN based segmentation network model of the present disclosure is robust and efficient for segmenting the anatomical structure with good accuracy. The methods and systems of the present disclosure can robustly detect the substructures even in the presence of anatomical and pathological structural anomalies. Further, the methods and systems of the present disclosure is fast, consistent with high accuracy.

Example Scenario

Dataset details: Automated Cardiac Diagnosis Challenge (ACDC) is a MICCAI 2017 challenge dataset acquired at the university hospital of Dijon, France. This consists of cardiac short-axis MRI images with the corresponding ground truth (GT) of LV, LV myocardium and RV for 100 patients. Each case contains all phases of 4D images: however, manual reference images are provided only in ED (end-diastole) and ES (end-systole) cardiac phases. The dataset is divided into 5 evenly distributed subgroups: normal case, heart failure with infarction, dilated cardiomyopathy, hypertrophic cardiomyopathy and abnormal right ventricle. Since we do not have the GT for the 50 test subjects, we divide the training dataset of 100 patients into 80 subjects for training and 20 subjects (4 from each subgroup) for testing. The dice score in this paper is the average performance results of 5-fold cross-validation.

Preprocessing: The cardiac MR images comprise the heart and the surrounding chest cavity like the lungs and diaphragm. To narrow the region of interest and localize the heart region (LV center), the images are cropped from the center to a 150×150×original depth and then zero-padded to 160×160×16 as per network requirement. The pixel values are normalized between [0, 1]. To increase the training samples and reduce storage dependency, on the go flip 3-D data augmentation is applied that randomly picks to flip over one of the three-axis, rotated the 3-D images over x, y, and z-axis randomly between 0-30 degrees, deformed the image using elastic deformation and altered the brightness using power-law gamma transformation. The techniques listed in the pre-processing are randomly selected for a specific time.

Implementation details: The proposed invention and the approach is implemented using Tensorflow and OpenCV. The generator uses an Adam optimizer with a learning rate ($l_r$) of $2e^{-4}$ and a beta of 0.5. The discriminator has RMSprop with $l_r$ of $1e^{-3}$, $\rho$, which is the discounting factor for the coming gradient is set to 0.5. Different dropout values are applied to both networks of the generator and the discriminator. The generator has a lower dropout of 0.3 as compared to the discriminator that has 0.5. By giving a higher dropout to the discriminator results in more dynamic so that it does not go to mode collapse, a common problem while training the GAN. Also, the low dropout to the generator helps in convergence and avoids vanishing gradient problem. The segmentation network model is trained with combined ES and ED dataset for 2500 epochs on a GPU.

Results: Dice score is used to evaluate the performance of the present disclosure with the state-of-the-art techniques. The ES and ED dataset are trained separately as well as combined training. It is observed that training ES and ED separately on the proposed segmentation network model had no major improvements. Hence, the present disclosure (the proposed segmentation network model) is robust enough to learn from both ED and ES images trained together and the below reported results are from combined training.

Figure 6:
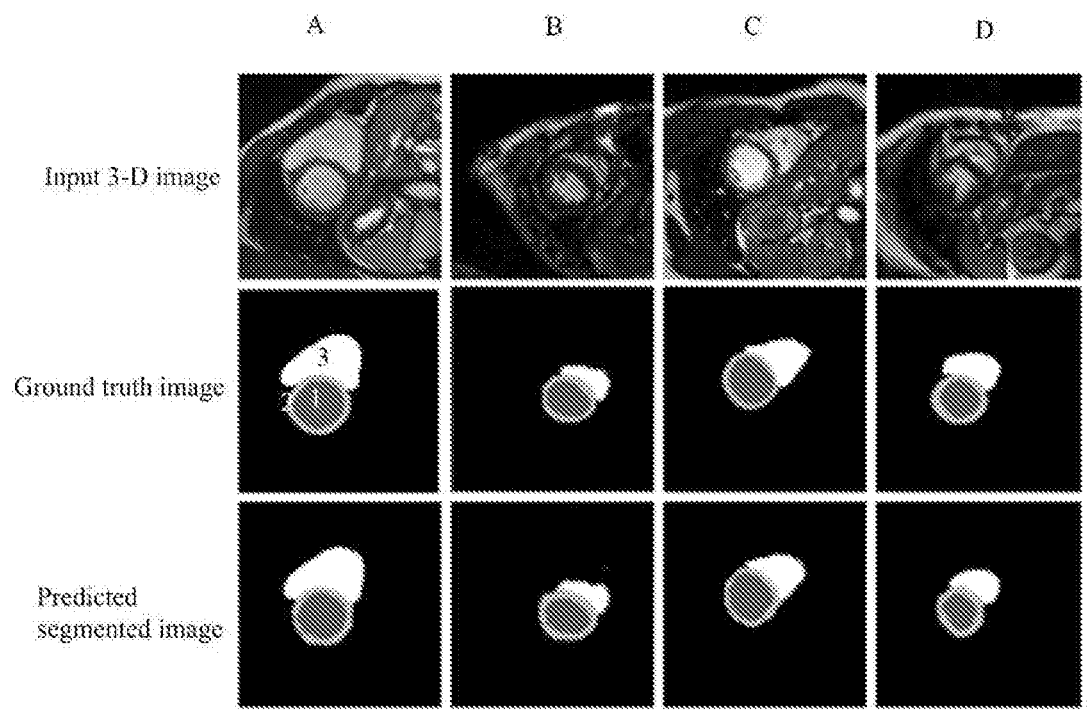
FIG. 6 shows performance results of the trained segmentation network model with Blind-testing on Multi-Centre, Multi-Vendor & Multi-Disease Cardiac Image Segmentation Challenge (M&Ms) dataset of different vendors, in accordance with some embodiments of the present disclosure.

FIG. 6 shows performance results of the trained segmentation network model with Blind-testing on Multi-Centre, Multi-Vendor & Multi-Disease Cardiac Image Segmentation Challenge (M&Ms) dataset of different vendors, in accordance with some embodiments of the present disclosure. As shown in FIG. 6, the present disclosure provides consistent results across all scanners from multiple vendors A, B, C, and D. In FIG. 6, region 1 is LV, 2 is Myocardium, and 3 is RV.

Figure 7:
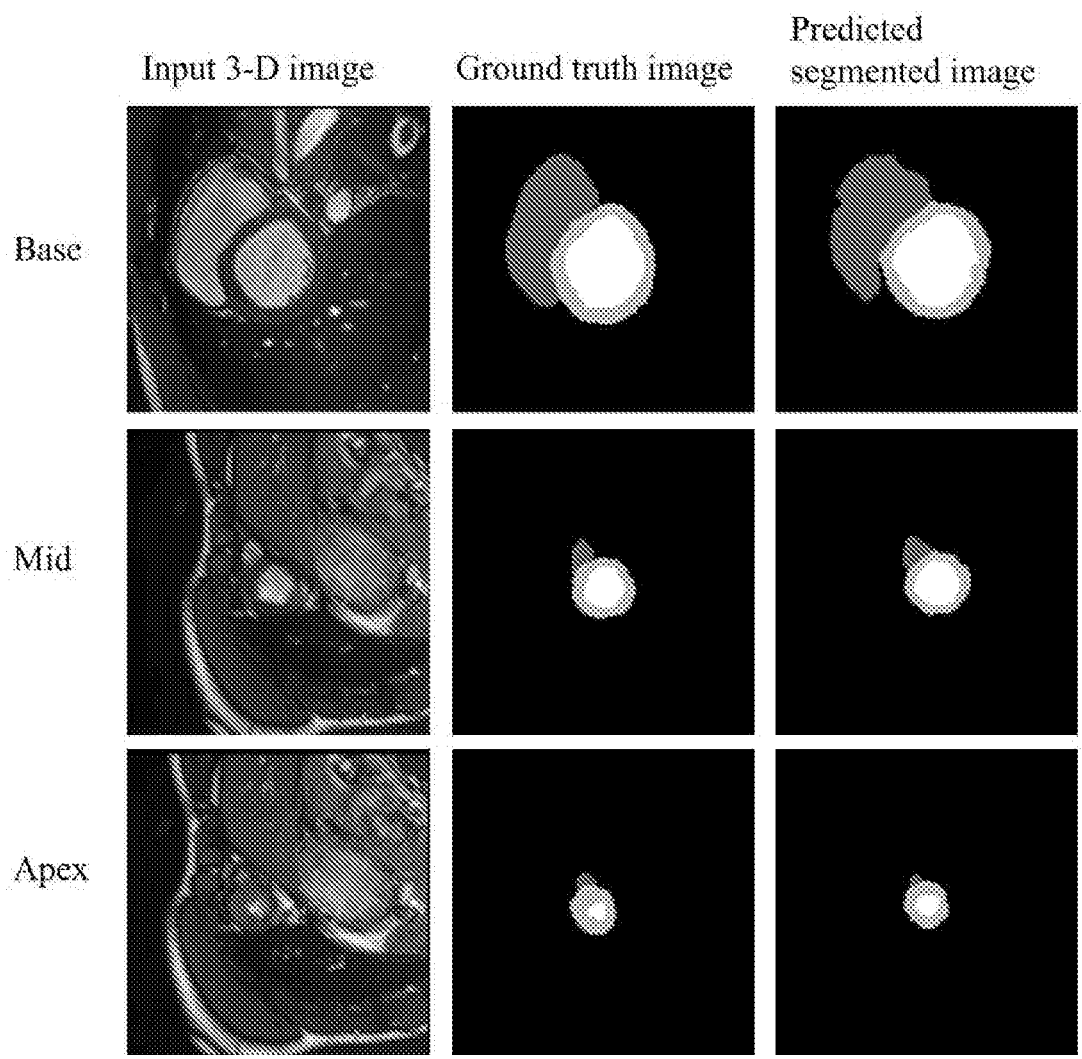
FIG. 7 shows a segmented output from a trained segmentation network model for basal, mid-ventricular, and apex ED slices, in accordance with some embodiments of the present disclosure.

FIG. 7 shows a segmented output from a trained segmentation network model for basal, mid-ventricular, and apex ED slices, in accordance with some embodiments of the present disclosure. The predicted output is close to ground truth (GT) shared by clinical experts for all three regions across different slice levels. The various shades of gray are the 3 different substructures as shown in the first GT image.

The embodiments of present disclosure herein address unresolved problem of accurately achieving 3-D image segmentation by using the GAN based segmentation network model. The performance results also shows that the present disclosure for the 3-D image segmentation is efficient, accurate and provide minute segmentation till the last slice.

The embodiment of the present disclosure is more explained with the example of heart as the anatomical structure as it is quite complex and need last minute slicing. However, the scope of the present disclosure is not limited to heart, other anatomical structure such as lungs, abdomen, and so on can also be utilized by the system and method of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for automated image segmentation of an anatomical structure, comprising the steps of:
   receiving, via one or more hardware processors, a plurality of 3-dimensional (3-D) training images corresponding to the anatomical structure and a ground-truth 3-D image associated with each of the plurality of 3-D training images, wherein the plurality of 3-D training images is associated with a plurality of classes of the anatomical structure;
   pre-processing, via the one or more hardware processors, the plurality of 3-D training images, to obtain a plurality of pre-processed training images;
   forming, via the one or more hardware processors, one or more mini-batches from the plurality of pre-processed training images, based on a predefined mini-batch size, wherein each mini-batch comprises one or more pre-processed training images; and
   training, via the one or more hardware processors, a segmentation network model, with the one or more pre-processed training images present in each mini-batch at a time, until the one or more mini-batches are completed for a predefined training epochs, to obtain a trained segmentation network model, wherein the segmentation network model comprises a generator and a patch-based discriminator, and training the segmentation network model with the one or more pre-processed training images present in each mini-batch comprises:
   passing each pre-processed training image present in the mini-batch to an encoder network of the generator, to obtain a set of patched feature maps and a set of encoded feature maps, corresponding to the pre-processed training image;
   channel-wise concatenating the set of patched feature maps and the set of encoded feature maps, through a bottleneck network of the generator, to obtain a concatenated feature map corresponding to each pre-processed training image;
   passing the concatenated feature map to a decoder network of the generator, to predict a segmented image corresponding to each pre-processed training image;
   predicting a probability value corresponding to each pre-processed training image, by using (i) the predicted segmented image corresponding to the pre-processed training image and (ii) the ground-truth 3-D image of the corresponding pre-processed training image, through the patch-based discriminator;
   calculating a value of a loss function of the segmentation network model, for the one or more pre-processed training images present in the mini-batch, using the predicted probability value corresponding to each pre-processed training image; and
   backpropagating weights of the segmentation network model, based on the calculated value of the loss function of the segmentation network model.

2. The processor-implemented method of claim 1, further comprising:
   receiving, via the one or more hardware processors, an input 3-D training image corresponding to the anatomical structure for the segmentation; and
   passing, via the one or more hardware processors, the input 3-D training image, to the trained segmentation model, to predict the segmented image corresponding to the input 3-D training image of the anatomical structure.

3. The processor-implemented method of claim 2, further comprising:
   obtaining, via the one or more hardware processors, one or more domain features of the predicted segmented image corresponding to the input 3-dimensional training image, using a domain feature extraction technique; and
   passing, via the one or more hardware processors, the one or more domain features of the predicted segmented image, to a classification network model, to predict a classification having a plurality of anomaly classes.

4. The processor-implemented method of claim 1, wherein pre-processing each 3-dimensional training image, to obtain a corresponding pre-processed training image, comprising: sequentially performing at least one of: (i) an image orientation normalization, (ii) a region of interest (ROI) extraction, (iii) a size normalization, (iv) a pixel value normalization, and (v) an image data augmentation, on each 3-D training image.

5. The processor-implemented method of claim 1, wherein the segmentation network model is a generative adversarial network (GAN) and comprising the generator and the patch-based discriminator, and wherein the generator comprises the encoder network, the bottleneck network, the decoder network, and a set of skip connections between the encoder network and the decoder network.

6. The processor-implemented method of claim 1, wherein the loss function of the segmentation network model for each pre-processed training image, comprises a generator loss and a discriminator loss, wherein the generator loss comprises a class-weighted generalized dice loss and an adversarial loss, and the discriminator loss comprises a real loss and a fake loss, and wherein:
the class-weighted generalized dice loss is calculated between the ground-truth 3-D image of the corresponding pre-processed training image and the predicted segmented image corresponding to the pre-processed training image, wherein the class-weighted generalized dice loss is calculated using pixel-based distribution technique;
the adversarial loss is calculated between the ground-truth 3-D image of the corresponding pre-processed training image and the predicted segmented image corresponding to the pre-processed training image;
the real loss is calculated between the corresponding pre-processed training image and the ground-truth 3-D image of the corresponding pre-processed training image; and
the fake loss is calculated between the corresponding pre-processed training image and predicted segmented image corresponding to the pre-processed training image.

7. The processor-implemented method of claim 6, wherein the class-weighted generalized dice loss is defined with one or more class weights that are associated with plurality of classes of the anatomical structure.

8. The processor-implemented method of claim 1, wherein a learning rate and a dropout of the segmentation network model are dynamically adjusted between the pre-defined training epochs during the training, based on the value of loss function at each predefined training epoch.

9. A system for automated image segmentation of an anatomical structure, comprising:
a memory storing instructions;
one or more input/output (I/O) interfaces; and
one or more hardware processors coupled to the memory via the one or more I/O interfaces, wherein the one or more hardware processors are configured by the instructions to:
receive a plurality of 3-dimensional (3-D) training images corresponding to the anatomical structure and a ground-truth 3-D image associated with each of the plurality of 3-D training images, wherein the plurality of 3-D training images is associated with a plurality of classes of the anatomical structure;
pre-process the plurality of 3-D training images, to obtain a plurality of pre-processed training images;
form one or more mini-batches from the plurality of pre-processed training images, based on a predefined mini-batch size, wherein each mini-batch comprises one or more pre-processed training images; and
train a segmentation network model, with the one or more pre-processed training images present in each mini-batch at a time, until the one or more mini-batches are completed for a predefined training epochs, to obtain a trained segmentation network model, wherein the segmentation network model comprises a generator and a patch-based discriminator, and training the segmentation network model) with the one or more pre-processed training images present in each mini-batch comprises:

passing each pre-processed training image present in the mini-batch to an encoder network of the generator, to obtain a set of patched feature maps and a set of encoded feature maps, corresponding to the pre-processed training image;
channel-wise concatenating the set of patched feature maps and the set of encoded feature maps, through a bottleneck network of the generator, to obtain a concatenated feature map corresponding to each pre-processed training image;
passing the concatenated feature map to a decoder network of the generator, to predict a segmented image corresponding to each pre-processed training image;
predicting a probability value corresponding to each pre-processed training image, by using (i) the predicted segmented image corresponding to the pre-processed training image and (ii) the ground-truth 3-D image of the corresponding pre-processed training image, through the patch-based discriminator;
calculating a value of a loss function of the segmentation network model, for the one or more pre-processed training images present in the mini-batch, using the predicted probability value corresponding to each pre-processed training image; and
backpropagating weights of the segmentation network model, based on the calculated value of the loss function of the segmentation network model.

10. The system of claim 9, wherein the one or more hardware processors are further configured by the instructions to:
receive an input 3-D training image corresponding to the anatomical structure for the segmentation; and
pass the input 3-D training image, to the trained segmentation model, to predict the segmented image corresponding to the input 3-D training image of the anatomical structure.

11. The system of claim 10, wherein the one or more hardware processors are further configured by the instructions to:
obtain one or more domain features of the predicted segmented image corresponding to the input 3-dimensional training image, using a domain feature extraction technique; and
pass the one or more domain features of the predicted segmented image, to a classification network model, to predict a classification having a plurality of anomaly classes.

12. The system of claim 9, wherein the one or more hardware processors are configured to pre-process each 3-dimensional training image, to obtain a corresponding pre-processed training image, by: sequentially performing at least one of: (i) an image orientation normalization, (ii) a region of interest (ROI) extraction, (iii) a size normalization, (iv) a pixel value normalization, and (v) an image data augmentation, on each 3-D training image.

13. The system of claim 9, wherein the segmentation network model is a generative adversarial network (GAN) and comprising the generator and the patch-based discriminator, and wherein the generator comprises the encoder network, the bottleneck network, the decoder network, and a set of skip connections between the encoder network and the decoder network.

14. The system of claim 9, wherein the loss function of the segmentation network model for each pre-processed training image, comprises a generator loss and a discriminator loss, wherein the generator loss comprises a class-weighted generalized dice loss and an adversarial loss, and the discriminator loss comprises a real loss and a fake loss, and wherein:
the class-weighted generalized dice loss is calculated between the ground-truth 3-D image of the corresponding pre-processed training image and the predicted segmented image corresponding to the pre-processed training image, wherein the class-weighted generalized dice loss is calculated using pixel-based distribution technique;
the adversarial loss is calculated between the ground-truth 3-D image of the corresponding pre-processed training image and the predicted segmented image corresponding to the pre-processed training image;
the real loss is calculated between the corresponding pre-processed training image and the ground-truth 3-D image of the corresponding pre-processed training image; and
the fake loss is calculated between the corresponding pre-processed training image and predicted segmented image corresponding to the pre-processed training image.

15. The system of claim 14, wherein the class-weighted generalized dice loss is defined with one or more class weights that are associated with plurality of classes of the anatomical structure.

16. The system of claim 9, wherein the one or more hardware processors are configured to dynamically adjust a learning rate and a dropout of the segmentation network model between the predefined training epochs during the training, based on the value of loss function at each predefined training epoch.

17. One or more non-transitory machine-readable information storage mediums comprising one or more instructions which when executed by one or more hardware processors cause:
receiving a plurality of 3-dimensional (3-D) training images corresponding to the anatomical structure and a ground-truth 3-D image associated with each of the plurality of 3-D training images, wherein the plurality of 3-D training images is associated with a plurality of classes of the anatomical structure;
pre-processing the plurality of 3-D training images, to obtain a plurality of pre-processed training images;
forming one or more mini-batches from the plurality of pre-processed training images, based on a predefined mini-batch size, wherein each mini-batch comprises one or more pre-processed training images; and
training a segmentation network model, with the one or more pre-processed training images present in each mini-batch at a time, until the one or more mini-batches are completed for a predefined training epochs, to obtain a trained segmentation network model, wherein the segmentation network model comprises a generator and a patch-based discriminator, and training the segmentation network model) with the one or more pre-processed training images present in each mini-batch comprises:
passing each pre-processed training image present in the mini-batch to an encoder network of the generator, to obtain a set of patched feature maps and a set of encoded feature maps, corresponding to the pre-processed training image;
channel-wise concatenating the set of patched feature maps and the set of encoded feature maps, through a bottleneck network of the generator, to obtain a concatenated feature map corresponding to each pre-processed training image;
passing the concatenated feature map to a decoder network of the generator, to predict a segmented image corresponding to each pre-processed training image;
predicting a probability value corresponding to each pre-processed training image, by using (i) the predicted segmented image corresponding to the pre-processed training image and (ii) the ground-truth 3-D image of the corresponding pre-processed training image, through the patch-based discriminator;
calculating a value of a loss function of the segmentation network model, for the one or more pre-processed training images present in the mini-batch, using the predicted probability value corresponding to each pre-processed training image; and
backpropagating weights of the segmentation network model, based on the calculated value of the loss function of the segmentation network model;
receiving an input 3-D training image corresponding to the anatomical structure for the segmentation;
passing the input 3-D training image, to the trained segmentation model, to predict the segmented image corresponding to the input 3-D training image of the anatomical structure;
obtaining one or more domain features of the predicted segmented image corresponding to the input 3-dimensional training image, using a domain feature extraction technique; and
passing the one or more domain features of the predicted segmented image, to a classification network model, to predict a classification having a plurality of anomaly classes.

* * * * *